O. B. Judd,
Saw-Set,
Nº 17,099.      Patented Apr. 21, 1857.
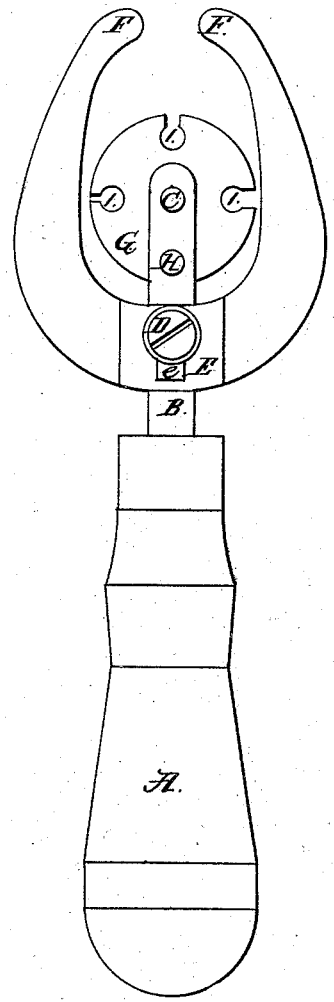
Inventor:
Oliver B Judd

UNITED STATES PATENT OFFICE.

OLIVER B. JUDD, OF LITTLE FALLS, NEW YORK.

SAW-SET.

Specification of Letters Patent No. 17,099, dated April 21, 1857.

*To all whom it may concern:*

Be it known that I, OLIVER B. JUDD, of Little Falls, in the county of Herkimer, in the State of New York, have invented a new and useful Improvement in Saw-Sets; and I do hereby declare that the following is a full and exact description thereof, reference being had to the accompanying drawing and to the letters of reference marked thereon.

The nature of my invention consists in combining a revolving graduated disk with a symmetrical gage and a simple lever in such a manner as to form an exceedingly simple saw-set, to be operated by simple movement of the lever in opposite directions, insuring an equal set in the teeth of a saw.

To enable others skilled in the art to make and use my invention, I will proceed to describe its construction and operation.

I form a lever of malleable iron, part of which is represented at B in the accompanying drawings. To one end of this lever I attach a wooden handle as A, in the opposite end I form a slot in which to operate the disk G, near this end I also drill two holes at C and H and tap another hole at D for a set-screw. The disk G I form of steel, through which I drill a hole in the center for the center pin C, around which the disk will turn. Then I drill other holes through the disk to correspond in size and distance from the center with the pin and hole through the lever at H. The number of these holes will correspond with the number of notches required. These notches are then formed by opening a space of proper width from each hole to the periphery of the disk as represented at 1, 1, 1.

E is a symmetrical gage so formed and fitted with a groove to slide over the metallic part of the lever at B, as to mantain an equal and uniform distance between its ends F, F, and the sides of the saw when standing in its proper notch for setting.

At *e*, is a slot formed in the gage for the set-screw D to move in. The breadth of this part of the gage must be such as to admit of a slot of sufficient length to admit of sufficient movement in the gage to insure all the variation of set that may be required in saws.

The center bolt C will remain fixed while the disk will revolve around it. The bolt or pin at H will be loose to be withdrawn when it is desired to turn the disk so as to bring a notch of the right grade to fit to the thickness of the saw to be set. When this is found and turned to its proper position, the position of the circular part of another notch will agree with the position of the hole in the lever, in which the pin must then be inserted to hold the disk from turning while setting the teeth of a saw, which operation will be performed by adjusting the notch to a tooth of the saw and moving the lever A sidewise until one of the ends of the gage F touches the side of the saw. Then place the notch on the next tooth and move the lever in the opposite direction until the other end of the gage is brought against the opposite side of the saw, and so on with all the teeth.

The degree of set to be given to the saw-teeth will be regulated by moving the gage backward or forward and holding it in position by means of the set-screw D, and as in doing so the ends of the gage F, F, will move in directions parallel with the sides of the saw, guided by its groove and the lever at B, the relative distances of the ends F, F, from the sides of the saw will invariably be alike, consequently will need no adjustment.

What I claim as my invention and desire to secure by Letters Patent, is—

The gage E having the jaws F, F, constructed as described and when used in connection with the revolving plate G operated in the manner specified.

OLIVER B. JUDD. [L. S.]

Witnesses:
B. LEVERSON,
JOHN S. HOLLINGSHEAD.